US 12,233,880 B2

(12) United States Patent
Jiang

(10) Patent No.: US 12,233,880 B2
(45) Date of Patent: Feb. 25, 2025

(54) METHODS AND SYSTEMS FOR INFORMATION RECOMMENDATION

(71) Applicant: BEIJING DIDI INFINITY TECHNOLOGY AND DEVELOPMENT CO., LTD., Beijing (CN)

(72) Inventor: Yue Jiang, Beijing (CN)

(73) Assignee: BEIJING DIDI INFINITY TECHNOLOGY AND DEVELOPMENT CO., LTD., Beijing (CN)

(*) Notice: Subject to any disclaimer, the term of this patent is extended or adjusted under 35 U.S.C. 154(b) by 772 days.

(21) Appl. No.: 17/187,744

(22) Filed: Feb. 27, 2021

(65) Prior Publication Data

US 2021/0221385 A1 Jul. 22, 2021

Related U.S. Application Data

(63) Continuation of application No. PCT/CN2019/103822, filed on Aug. 30, 2019.

(30) Foreign Application Priority Data

Aug. 31, 2018 (CN) .......................... 201811008747.6

(51) Int. Cl.
*B60W 40/00* (2006.01)
*B60W 40/09* (2012.01)
*B60W 50/14* (2020.01)

(52) U.S. Cl.
CPC ............ *B60W 40/09* (2013.01); *B60W 50/14* (2013.01); *B60W 2540/30* (2013.01); *B60W 2556/10* (2020.02)

(58) Field of Classification Search
None
See application file for complete search history.

(56) References Cited

U.S. PATENT DOCUMENTS

| 8,736,434 B2 | 5/2014 | Miller et al. |
| 9,651,391 B1* | 5/2017 | Hayes ................ G06Q 30/0255 |

(Continued)

FOREIGN PATENT DOCUMENTS

| CN | 100397434 C | 6/2008 |
| CN | 101470951 B | 9/2010 |

(Continued)

OTHER PUBLICATIONS

International Search Report in PCT/CN2019/103822 mailed on Nov. 27, 2019, 6 pages.

(Continued)

*Primary Examiner* — Truc M Do
(74) *Attorney, Agent, or Firm* — METIS IP LLC

(57) ABSTRACT

The embodiments of the present disclosure may disclose methods and systems for information recommendation. The method for information recommendation method may include: determining a violation count corresponding to a violation behavior in historical driving behavior of a driver; determining, based on the violation behavior and its corresponding violation count, information to be recommended; and sending the information to be recommended to a driver terminal of the driver.

20 Claims, 6 Drawing Sheets

(56) References Cited

U.S. PATENT DOCUMENTS

| | | | | |
|---|---|---|---|---|
| 2014/0113619 A1* | 4/2014 | Tibbitts | ............... | H04W 48/04 |
| | | | | 455/419 |
| 2015/0191178 A1* | 7/2015 | Roy | ............... | H04W 4/48 |
| | | | | 701/36 |
| 2015/0210287 A1* | 7/2015 | Penilla | ............... | B60N 2/002 |
| | | | | 701/49 |
| 2016/0046298 A1* | 2/2016 | DeRuyck | ............... | B60W 40/09 |
| | | | | 340/576 |
| 2016/0150070 A1 | 5/2016 | Goren et al. | | |
| 2016/0232785 A1 | 8/2016 | Wang | | |
| 2017/0228683 A1 | 8/2017 | Hu et al. | | |
| 2019/0389455 A1* | 12/2019 | Reed | ............... | B60W 30/085 |

FOREIGN PATENT DOCUMENTS

| | | |
|---|---|---|
| CN | 103198685 A | 7/2013 |
| CN | 102646329 B | 9/2014 |
| CN | 104077819 A | 10/2014 |
| CN | 104537860 A | 4/2015 |
| CN | 105160899 A | 12/2015 |
| CN | 105719360 A | 6/2016 |
| CN | 105869229 A | 8/2016 |
| CN | 106056162 A | 10/2016 |
| CN | 106126960 A | 11/2016 |
| CN | 106372817 A | 2/2017 |
| CN | 106683395 A | 5/2017 |
| CN | 104537860 B | 10/2017 |
| CN | 107963082 A | 4/2018 |
| CN | 207249919 U | 4/2018 |

OTHER PUBLICATIONS

Written Opinion in PCT/CN2019/103822 mailed on Nov. 27, 2019, 10 pages.

First Office Action in Chinese Application No. 201811008747.6 mailed on Jul. 7, 2020, 15 pages.

Office Action in Russian Application No. 2021104724 mailed on Sep. 8, 2021, 10 pages.

* cited by examiner

METHODS AND SYSTEMS FOR INFORMATION RECOMMENDATION

CROSS-REFERENCE TO RELATED APPLICATIONS

This application is a continuation of International Application No. PCT/CN20191103822, filed on Aug. 30, 2019, which claims priority to Chinese Application No, 201811008747.6, filed on Aug. 31, 2018, the contents of each of which are hereby incorporated by reference.

TECHNICAL FIELD

The present disclosure relates to the Internet field, and in particular, to methods and systems for information recommendation.

BACKGROUND

With the continuous development of urban transportation, car-hailing has become one of the important travel modes for different people. At the same time, with the rapid development of the mobile Internet and the popularization of smart devices, the use of car-hailing service platforms has become more and more common. In a car-hailing service platform, drivers may be provided with real-time driving safety tips based on their driving behavior in a navigation system, which can improve the driver's driving ability and safety awareness, and also reduce the occurrence of traffic accidents and improve passengers' experience.

SUMMARY

One of the embodiments of the present disclosure provides methods for information recommendation. The method for information recommendation may include: determining a violation count corresponding to a violation behavior in historical driving behavior of a driver; determining, based on the violation behavior and its corresponding violation count, information to be recommended; and sending the information to be recommended to a driver terminal of the driver.

In some embodiments, the determining a violation count corresponding to a violation behavior in historical driving behavior of a driver may include: obtaining historical data relating to the historical driving behavior of the driver, the historical data including at least one of passenger evaluation information regarding completed orders of the driver, status data of the historical driving behavior of the driver, or historical violation records of the driver; and determining, based on the historical data, the violation count corresponding to the violation behavior of the driver.

In some embodiments, the status data of the historical driving behavior of the driver may include at least one of a speed, an acceleration, an angular velocity, an angular acceleration, a driving path, or a road condition.

In some embodiments, the information to be recommended may include safety prompt information for prompting the driver to pay attention to the violation behavior.

In some embodiments, the determining the information to be recommended may include: determining whether the violation count corresponding to the violation behavior exceeds a first preset threshold; and in response to a determination result that the violation count corresponding to the violation behavior exceeds the first preset threshold, sending the safety prompt information to the driver terminal of the driver.

In some embodiments, the information recommendation method may further include: determining, based on at least one of a type of the violation behavior and the historical driving behavior of the driver, the first preset threshold.

In some embodiments, the information to be recommended may include restriction information for restricting the driver from accepting orders.

In some embodiments, the determining the information to be recommended may include: determining whether the violation count corresponding to the violation behavior exceeds a second preset threshold; and in response to a determination result that the violation count corresponding to the violation behavior exceeds the second preset threshold, sending the restriction information to the driver terminal of the driver.

In some embodiments, the information to be recommended may include reward information.

In some embodiments, the determining the information to be recommended may include: determining whether the violation count corresponding to the violation behavior is less than a third preset threshold or shows a decreasing trend in a historical time period; and in response to a determination result that the violation count corresponding to the violation behavior is less than the third preset threshold or shows a decreasing trend in the historical time period, sending the reward information to the driver terminal of the driver.

In some embodiments, the sending the information to be recommended to a driver terminal of the driver may include: determining whether a recommendation condition is met; and in response to a determination result that the recommendation condition is met, sending the information to be recommended to the driver terminal of the driver.

In some embodiments, the determining whether a recommendation condition is met may include: obtaining data corresponding to current driving behavior of the driver; and determining, based on the data corresponding to the current driving behavior of the driver, whether the recommendation condition is met.

In some embodiments, the information recommendation method may further include: obtaining profile information of the driver; and determining, based on the profile information, the information to be recommended.

In some embodiments, the profile information of the driver may include at least one of an age, a gender, a driving experience, or an education level.

In some embodiments, the information to be recommended may include at least one of voice information, text information, or image information.

In some embodiments, the violation behavior may include at least one of not slowing down at an intersection, inattention, fatigue driving, drunk driving, running a red light, rapid acceleration, rapid deceleration, changing lanes rapidly, having an inconsistent credential, or having a bad attitude.

One of the embodiments of the present disclosure provides a system for information recommendation. The system may include at least one storage device for storing computer instructions, and at least one processor communicating with the storage device. When the at least one processor executes the computer instructions, the at least one processor may cause the system to: determine the number of violations in the driver's historical driving behavior; determine, based on the violation behavior and its corresponding violation count, information to be recommended; and send the information to be recommended to a driver terminal of the driver.

One of the embodiments of the present disclosure provides a device including a processor configured to perform any method for information recommendation described in the present disclosure.

One of the embodiments of the present disclosure provides a computer-readable storage medium storing a set of instructions, wherein when executed by at least one processor, the set of instructions may direct the at least one processor to effectuate a method for information recommendation described in the present disclosure.

BRIEF DESCRIPTION OF THE DRAWINGS

The present disclosure is further illustrated in terms of exemplary embodiments. These exemplary embodiments are described in detail with reference to the drawings. These embodiments are non-limiting exemplary embodiments, in which like reference numerals represent similar structures, and wherein.

DETAILED DESCRIPTION

Figure 1A:
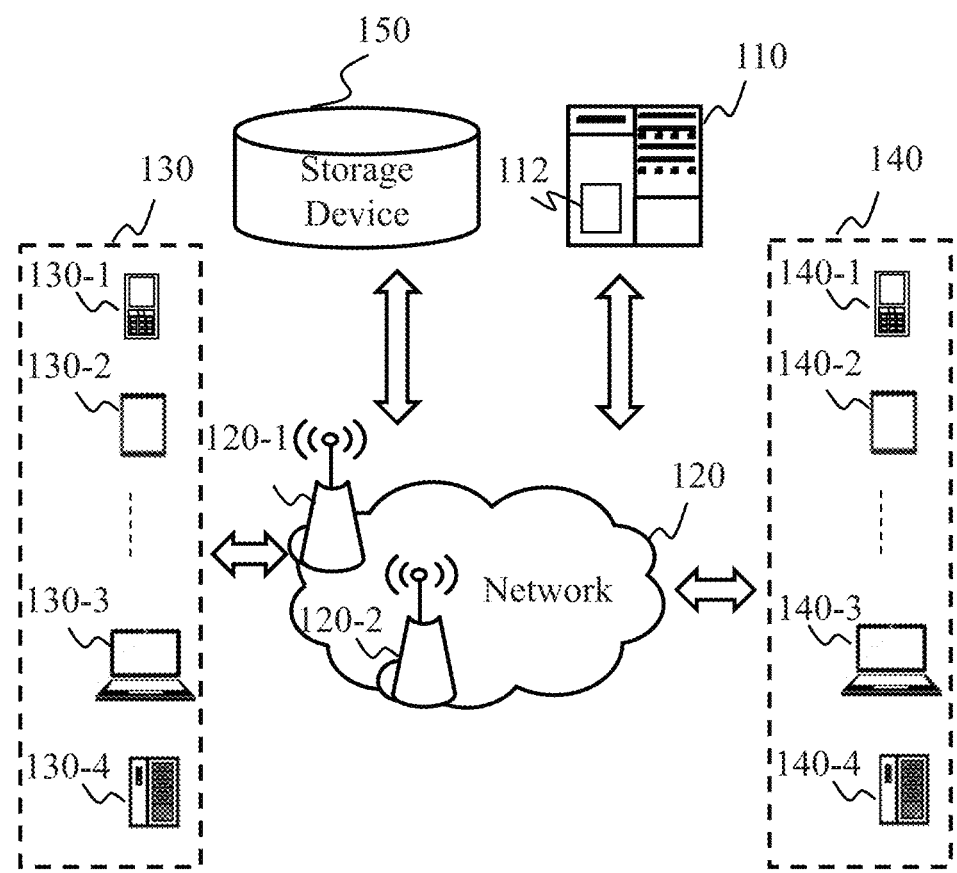
FIG. 1A is a schematic diagram illustrating an exemplary information recommendation system according to some embodiments of the present disclosure.

In order to more clearly illustrate the technical solutions related to the embodiments of the present disclosure, a brief introduction of the drawings referred to the description of the embodiments is provided below. Obviously, the drawings described below are only some examples or embodiments of the present disclosure. Those having ordinary skills in the art, without further creative efforts, may apply the present disclosure to other similar scenarios according to these drawings. Unless obviously obtained from the context or the context illustrates otherwise, the same numeral in the drawings refers to the same structure or operation.

It should be understood that the "system," "device," "unit," and/or "module" used herein are one method to distinguish different components, elements, parts, sections, or assemblies of different levels. However, if other words can achieve the same purpose, the words can be replaced by other expressions.

As used in the disclosure and the appended claims, the singular forms "a," "an," and "the" include plural referents unless the content clearly dictates otherwise. In general, the terms "comprise," "comprises," and/or "comprising," "include," "includes," and/or "including," merely prompt to include steps and elements that have been clearly identified, and these steps and elements do not constitute an exclusive listing. The methods or devices may also include other steps or elements.

The flowcharts used in the present disclosure illustrate operations that the system implements according to the embodiment of the present disclosure. It should be understood that the foregoing or following operations may not necessarily be performed exactly in order. Instead, the operations may be processed in reverse order or simultaneously. Besides, one or more other operations may be added to these processes, or one or more operations may be removed from these processes.

Embodiments of the present disclosure may be applied to different transport service systems, including but not limited to land, water surface navigation, aviation, aerospace, etc., or any combination thereof. For example, rickshaws, vehicle vehicles, automobiles (for example, small cars, buses, large transport vehicles, etc.), rail transportation (for example, trains, high-speed trains, subways, etc.), ships, airplanes, spacecraft, satellites, hot air balloons, unmanned vehicles, etc. The application scenarios of different embodiments of the present disclosure may include a transportation industry, a warehousing and logistics industry, an agricultural operation system, an urban public transportation system, commercial operation vehicles, or the like, or any combination thereof. It should be understood that the application scenarios of systems and methods of the present disclosure are merely some examples or embodiments of the present disclosure. For those skilled in the art, the present disclosure may be applied to other similar scenarios according to these drawings without creative work. For example, other similar driving systems with trajectories.

FIG. 1A is a schematic diagram illustrating an exemplary information recommendation system according to some embodiments of the present disclosure. Information recommendation system 100 may include a server 110, a network 120, at least one passenger terminal 130, at least one driver terminal 140, and a storage device 150. The server 110 may include a processing device 112. Components in the information recommendation system 100 may be connected in various ways. For example, one component in the information recommendation system 100 may communicate with another component via the network 120. For example, the server 110 may obtain information and/or data from the passenger terminal 130 via the network 120. As another example, the server may send information and/or data to the passenger terminal 130 via the network 120.

In some embodiments, the server 110 may be an independent server or a server group. The server group may be centralized or distributed (for example, the server 110 may be a distributed system). In some embodiments, the server 110 may be local or remote. For example, the server 110 may access information and/or data stored in the passenger terminal 130, the driver terminal 140, and/or the storage device 150 via the network 120. In some embodiments, the server 110 may be directly connected to the passenger terminal 130, the driver terminal 140, and/or the storage device 150 to access the information and/or data stored therein. In some embodiments, the server 110 may be implemented on a cloud platform. For example, the cloud platform may include a private cloud, public cloud, a hybrid cloud, a community cloud, a distributed cloud, an inter-cloud, etc., or any combination thereof.

In some embodiments, the server 110 may include a processing device 112. The processing device 112 may process data and/or information relating to a service request to perform one or more functions described in the present disclosure. For example, the processing device 112 may determine information to be recommended to a driver based on driving data obtained from a driver terminal 140 of the driver. In some embodiments, the processing device 112 may include one or more sub-processing devices (for example, a single-core processing device or a multi-core and multi-core processing device). Merely by way of example, the processing device 112 may include a central processor (CPU), an application specific integrated circuit (ASIC), an application specific instruction set processor (ASID), a graphics processing unit (GPU), a paralleling and protection unit (PPU), a digital signal processor (DSP), a field programmable gate array (FPGA), a programmable logic device (PLD), a controller, a microcontroller unit, reduced instruction set computer (RISC), a microprocessor, etc., or any combination of thereof.

The network 120 may be a single network or a combination of different networks. For example, the network 120 may include a local area network (LAN), a wide area network (WAN), a public network, a private network, a wireless local area network (WLAN), a virtual network, a metropolitan area network (MAN), a public switched telephone network (PSTN), or the Ike, or any combination thereof. For example, the server 110 may communicate with a passenger terminal 130 via Bluetooth. The network 120 may also include various network access points. For example, wired or wireless access points, such as base stations or the Internet may be included in the network 120. The server 110 may access the information stored in the server 110 directly or via the network 120.

The passenger terminals) 130 that can be connected to the network 120 may include a mobile device 130-1, a tablet computer 130-2, a laptop computer 130-3, a built-in device 130-4, etc., or any combination thereof. In some embodiments, the mobile device 130-1 may include a wearable device, a smart mobile device, a virtual reality device, an augmented reality device, etc., or any combination thereof. In some embodiments, the server 110 may control a passenger terminal 130 through a wearable device. The wearable device may include a smart bracelet, a smart footgear, a pair of smart glasses, a smart helmet, a smart watch, a smart clothing, a smart backpack, a smart accessory, etc., or any combination thereof. In some embodiments, the smart mobile device may include a smartphone, a personal digital assistant (PDA), a gaming device, a navigation device, a point of sale (POS) device, etc., one or any combination thereof. In some embodiments, the virtual reality device and/or augmented reality device may include a virtual reality helmet, a pair of virtual reality glasses, a virtual reality patch, an augmented reality helmet, a pair of augmented reality glasses, an augmented reality patch, etc., or any combination thereof. For example, the virtual reality device and/or the augmented reality device may include a Google™ Glass, an Oculus Rift, a HoleLens, a Gear VR, etc. In some embodiments, the built-in device 130-4 may include a vehicle-mounted computer, a vehicle-mounted TV, etc. In some embodiments, the server 110 may obtain passenger evaluation information of a driver from a passenger terminal 130.

In some embodiments, a driver terminal 140 may be a device similar to or the same as a passenger terminal 130. In some embodiments, the driver terminal 140 may be a device with positioning technology to determine the location of a driver and/or the driver terminal 140. The passenger terminal 130 may be a device with positioning technology to determine the location of a passenger and/or the passenger terminal 130. In some embodiments, the passenger terminal 130 and/or the driver terminal 140 may communicate with other positioning devices to determine locations of the passenger, the passenger terminal 130, the driver, or the driver terminal 140. In some embodiments, the passenger terminal 130 and/or the driver terminal 140 may send positioning information to the server 110.

The passenger terminal 130 and the driver terminal 140 may be collectively referred to as users, user terminals, or terminals, which may be individuals, tools, or other entities related to service orders, such as service requesters and/or service providers of the service orders. A Passenger may be a service demander. In the present disclosure, "passenger," "service requester," "passenger terminal," "service requester terminal," and "passenger terminal device" may be used interchangeably. The passenger may be a user of the passenger terminal 130. In some embodiments, the user may not be the passenger himself. For example, a user A of the passenger terminal 130 may use the passenger terminal 130 to request an on-demand service for a passenger B. For the sake of simplicity, a user of the passenger terminal 130 may also be referred to as a passenger for short. A driver may be a service provider. In the present disclosure, "driver," "service receiver," "driver terminal," "service receiver terminal," and "driver terminal device" may be used interchangeably. The driver may be a user of the driver terminal 140. In some embodiments, the user may not be the driver himself. For example, a user C of the driver terminal 140 may use the driver terminal 140 to receive other information or instructions sent by the service system 110 for a driver D. For the sake of simplicity, a user of the driver terminal 140 may also be referred to as a driver. In some embodiments, the user of the driver terminal 140 is a tool. In such cases, the driver terminal 140 may include a desktop computer 140-1, a laptop computer 140-2, a built-in device 140-3 of a motor vehicle, a mobile device 140-4, etc., or any combination thereof. In some embodiments, the user of the passenger terminal 130 and/or the driver terminal 140 may also be another smart terminal, such as a smart home device, a wearable device, a smart mobile device, or another smart device. The smart home device may include a smart lighting device, a control device of an intelligent electrical apparatus, a smart monitoring device, a smart television, a smart video camera, a smart phone, an interphone, etc., or any combination thereof. The wearable device may include a smart bracelet, a smart watch, a smart footgear, a pair of smart glasses, a smart helmet, a smart headband, a smart clothing, a smart backpack, a smart accessory, etc., one or a combination thereof. The smart mobile device may include a built-in device in a vehicle (a vehicle-mounted computer or a vehicle-mounted TV, etc.), a gaming device, a GPS device, and a POS device, etc., or any combination thereof.

The storage device 150 may store data and/or instructions. In some embodiments, the storage device 150 may store data obtained from the passenger terminal 130 and/or the driver terminal 140. In some embodiments, the storage device 150 may store information and/or instructions that the server 110 may execute or use to perform exemplary methods described in the present disclosure. In some embodiments, the storage device 150 may include a mass storage device, a removable storage device, a volatile read-write memory (such as a random access memory RAM), a read-only memory (ROM), etc., or any combination thereof. In some embodiments, the storage device 150 may be implemented on a cloud platform. For example, the cloud platform may include a private cloud, a public cloud, a hybrid cloud, a community cloud, a community cloud, a distributed cloud, an inter-cloud, etc., or any combination thereof.

In some embodiments, one or more components in the information recommendation system 100 (e.g., the server 110, the passenger terminal 130, the driver terminal 140, etc.) may have access to the storage device 150. In some embodiments, when one or more conditions are met, one or more components in the information recommendation system 100 (e.g., the server 110, the driver terminal 140, the passenger terminal 130, etc.) may read and/or modify information related to a requester, a provider, and/or common knowledge. For example, after a car-hailing service ends, the server 110 may read and/or modify information of one or more users.

Figure 1B:
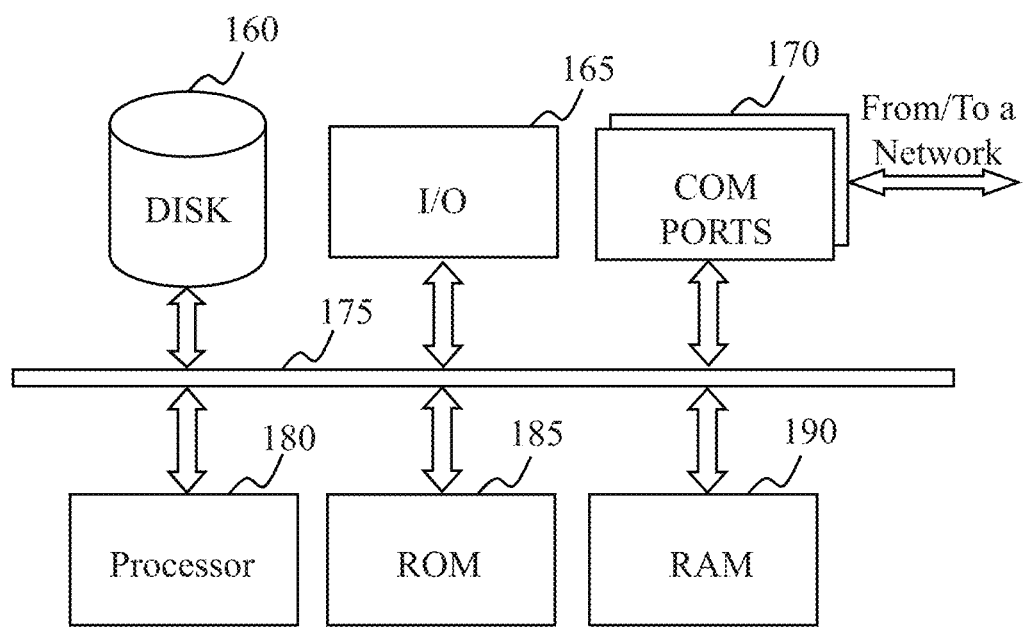
FIG. 1B is a schematic diagram illustrating exemplary hardware and/or software components of a computing device according to some embodiments of the present disclosure.

FIG. 1B is a schematic diagram illustrating exemplary hardware and/or software components of a computing device 100B according to some embodiments of the present disclosure. The computing device 100B may be configured to implement any component of the information recommendation system 100 as described herein. For example, the processing device 112, the passenger terminal 130, and/or the driver terminal 140 may be implemented on the computing device 100B through its hardware, software program, firmware, or a combination thereof, respectively. Although only one such computing device is shown, for convenience, the computer functions related to the information recommendation system 100 described herein may be implemented in a distributed fashion on a plurality of similar platforms to distribute the processing load.

The computing device 100E may include a communication port 170 connected to a network connected thereto to facilitate data communication. The computing device 100B may also include a processor 180 configured to execute instructions. The instructions may include, for example, programs, objects, components, signals, data structures, procedures, modules, and functions that perform specific functions described herein. In some embodiments, the processor 180 may process information related to one or more components of the information recommendation system 100. For example, the processor 180 may determine information to be recommended by analyzing a driver's violation behavior, and send the information to be recommended to the driver terminal 140 of the driver. In some embodiments, the processor 180 may include at least one hardware processor, such as a microcontroller, a microprocessor, a reduced instruction set computer (RISC), an application-specific integrated circuit (ASIC), an application-specific instruction-set processor (ASIP)), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of performing at least one function, or any combination thereof.

The computing device 100B may also include an internal communication bus 175, different types of program storage and data storage device, including, for example, a hard disk 160, a read-only memory (ROM) 185, or a random access memory (RAM) 190. In some embodiments, program instructions may be stored in the ROM 185, RAM 190, and/or other types of non-transitory storage media and executed by the processor 180. The method and/or process of the present disclosure may be implemented in the form of program instructions. The computing device 100B may also include an I/O component 165 configured to supporting input/output between the computing device 100B and other components. The computing device 100B may also receive instructions and data via network communication.

Merely for illustration, only one processor is shown in FIG. 1B. However, it should be noted that the computing device 100B in the present disclosure may also include a plurality of processors. Therefore, operations and/or method operations performed by one processor described in this application may also be performed jointly or separately by a plurality of processors. For example, if in the present disclosure, the processor of the computing device 100B performs operation A and operation B, it should be understood that operation A and operation B may also be performed jointly or separately by two different processors in the computing device 100B. For example, a first processor performs operation A and a second processor performs operation B, or the first and second processors jointly perform operations A and B.

Figure 2:
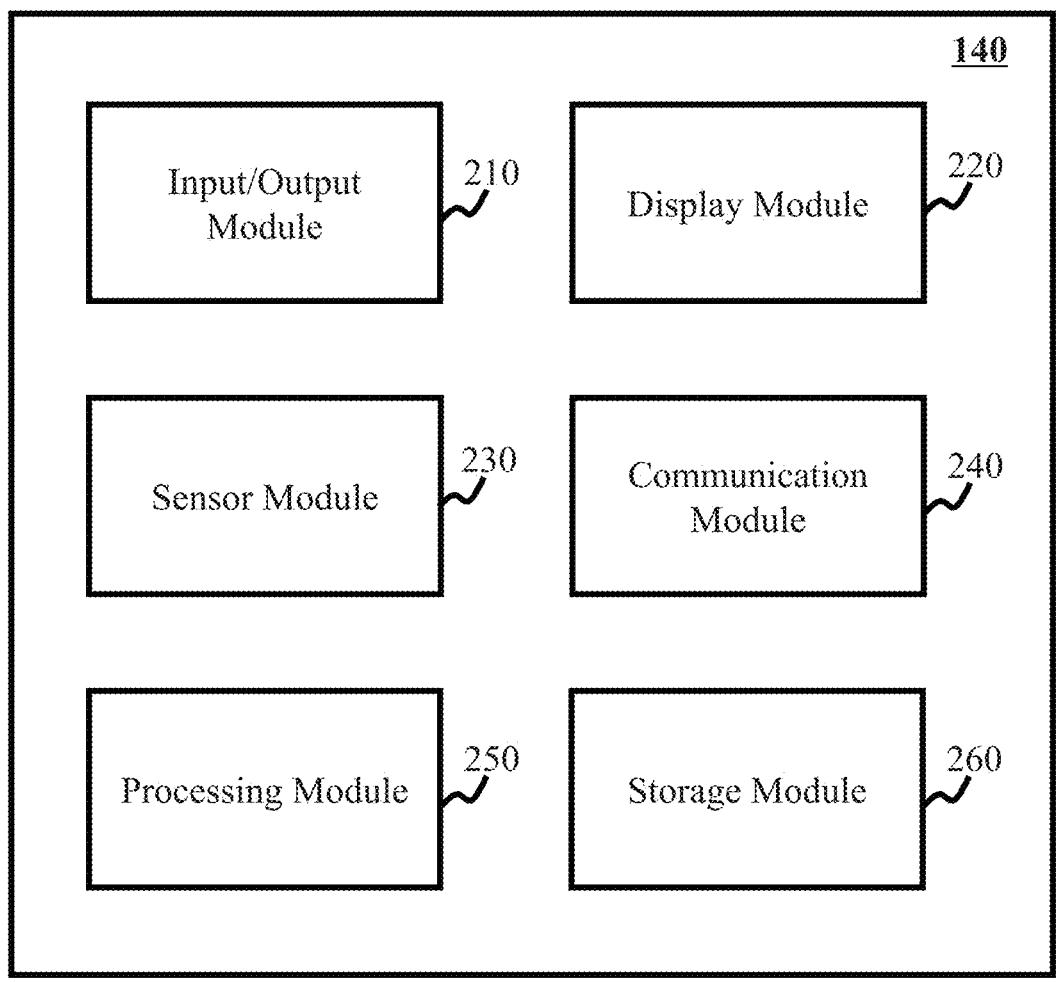
FIG. 2 is a schematic diagram illustrating an exemplary driver terminal device according to some embodiments of the present disclosure.

FIG. 2 is a schematic diagram illustrating an exemplary driver terminal 140 according to some embodiments of the present disclosure. As shown in FIG. 2, the driver terminal 140 may include an input/output module 210, a display module 220, a sensor module 230, a communication module 240, a processing module 250, and a storage module 260. In some embodiments, the driver terminal 140 may include one or more additional modules or components.

The input/output module 210 may receive a passengers evaluation regarding the driving behavior of a driver of the driver terminal 140, and output the evaluation provided by the passenger in one or more forms. The evaluation may be represented in one or more input forms including images, voices, texts, etc., or any combination thereof. The input/output module 210 may also collect and record one or more of optical, acoustic, electromagnetic, mechanical, and other information of passengers or the outside world in the form of still pictures, videos, audio, and/or mechanical vibrations through signal conversion and other means. The input or output form may include a sound signal, a light signal, a mechanical vibration signal, etc.; or any combination thereof. In some embodiments, the input/output module 210 may obtain environmental information around a vehicle. For example, the input/output module 210 may obtain images around the vehicle through hardware, such as a camera or a video camera. Specifically, the images around the vehicle may include an image of an intersection, an image of a traffic light, etc., or any combination thereof.

The display module 220 may display a graphic interface, an operating system interface, or the like. In some embodiments, the display module 220 may display information to be recommended. The display module 220 may display the information to be recommended in the form of an image, voice, text, etc., or any combination thereof.

The sensor module 230 may determine driving data of a driver based on one or more sensors. In some embodiments, the sensor module 230 may determine a location of a driver. Technologies for determining the driver's location may include a Global Positioning System (GPS) technology, a Global Navigation Satellite System (GLONASS) technology, a Compass Navigation System (COMPASS) technology, a Galileo Positioning System (Galileo) technology, a Quasi-zenith Satellite System (QZSS) technology, a Beidou Satellite Positioning System (BDS) technology, a wireless fidelity (WiFi) positioning technology, etc., or any combination thereof. In some embodiments, the sensor module 230 may determine one or more motion parameters of the driver, such as a speed, an acceleration, an angular velocity, an angular acceleration, a driving path, a road condition, or the like, or any combination thereof.

The communication module 240 may send and/or receive information relating to the driver terminal 140 in a wired or wireless manner. For example, the communication module 240 may send to or receive information from the processing device 112. In some embodiments, the driver terminal 140 may also communicate with passengers through the communication module 240. For example, a communication method may include Bluetooth communication and infrared communication. The processing module 250 may analyze and process information obtained by the driver terminal 140.

The storage module 260 may store information obtained, generated, analyzed, and/or processed by the input/output module 210, the sensor module 230, the communication module 240, and the processing module 250.

It should be noted that the above description of the driver terminal 140 is only for the convenience of description, and does not limit the present disclosure within the scope of the embodiments mentioned. It may be understood that, for those skilled in the art, after understanding the functions performed by the driver terminal, when the above functions are realized, various modules may be combined arbitrarily, or the subsystems may be connected to other modules and various modifications and changes in the form and details of the application field of the methods and systems may be implemented. For example, the input/output module 210 and the display module 220 may be different modules embodied in one system, or one module that may implement functions of the above two modules. As another example, the sensor module 230 and the communication module 240 may be different modules, or the same module integrated into the same hardware. Such modifications are all within the protection scope of the present disclosure.

Figure 3:
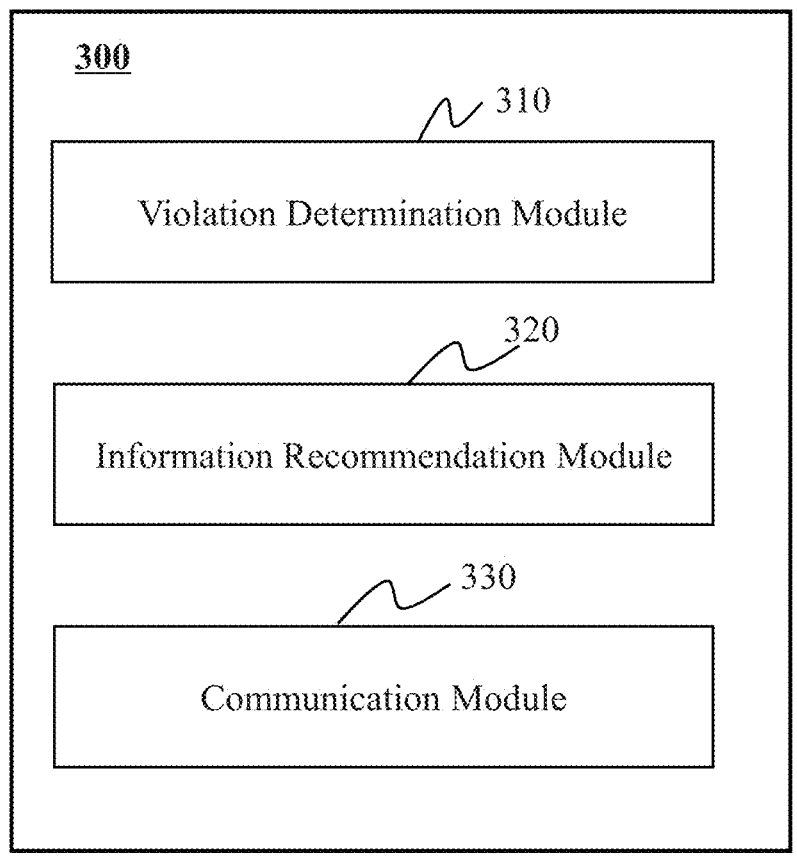
FIG. 3 is a block diagram illustrating an exemplary information recommendation system according to some embodiments of the present disclosure.

FIG. 3 is a block diagram illustrating an exemplary information recommendation system according to some embodiments of the present disclosure. As shown in FIG. 3, the information recommendation system 300 may include a violation determination module 310, an information recommendation module 320, and a communication module 330. In some embodiments, the violation determination module 310, the information recommendation module 326, and the communication module 330 may be included in the processing device 112 shown in FIG. 1A.

The violation determination module 310 may determine a violation behavior of a driver and its corresponding violation count. The violation behavior of the driver may include any behavior that does not comply with one or more driver behavior regulations (for example, system default regulations in a car-hailing platform and/or regulations set by a user). For example, the violation behavior of the driver may include a driving violation behavior, a pickup violation behavior, a service violation behavior, etc., or any combination thereof. Exemplary driving violation behavior may include not slowing down at an intersection, inattention, fatigue driving, drunk driving, illegal parking, running a red light, rapid acceleration, rapid deceleration, changing lanes rapidly, etc., or any combination thereof. Exemplary pickup violation behavior may include slow pick-up speed, detour driving, malicious refusal to load, carpooling violation behavior, not driving along a prescribed route, etc., or any combination thereof. Exemplary service violation behavior may include having an inconsistent credential, having a bad attitude, personal attacks, infringement of life and property, etc., or any combination thereof. In some embodiments, the violation determination module 310 may obtain data relating to historical driving behavior of a driver, such as passenger evaluation information regarding completed orders of the driver, status data of driving behavior of the driver, historical violation records of the driver, etc., or any combination thereof. The violation determination module 310 may further determine the violation behavior of the driver and its corresponding violation count based on the data relating to the historical driving behavior of the driver. Detailed descriptions of the determination of the violation behavior and the violation count may be found elsewhere in the present disclosure, such as operation 410 and related descriptions.

The information recommendation module 320 may be configured to determine information that needs to be recommended to a driver. The determination of the information to be recommended may include determining a type of the information to be recommended, determining the content of the information to be recommended, determining a recommendation time of the information to be recommended, determining a recommendation frequency of the information to be recommended, etc., or any combination thereof. In some embodiments, the information to be recommended may include safety prompt information, restriction information, reward information, etc., or any combination thereof. The safety prompt information may be intended to provide a safety prompt to the driver, for example, to prompt the driver to avoid a certain violation behavior. The restriction information may be configured to restrict the driver from accepting orders, such as restrict the time, the place, and the count of orders that the driver can accept orders. The reward information may be configured to encourage or reward the driver, for example, reward the driver for complying with driver's regulations and/or correcting violation behavior.

In some embodiments, the information recommendation module 320 may determine the information to be recommended (for example, a type and a recommendation frequency of information to be recommended) according to one or more thresholds of violation counts. In some embodiments, the information recommendation module 320 may determine customized information to be recommended for different drivers. For example, the information recommendation module 320 may obtain profile information of the driver, and determine the information to be recommended based on the profile information. As another example, the information recommended determination module 320 may customize the information to be recommended based on the historical violation behavior of the driver. Detailed descriptions of the determination of the information to be recommended may be found elsewhere in the present disclosure, such as operation 420 and related descriptions.

The communication module 330 may enable internal components of the information recommendation system 300 to communicate with each other. For example, the communication module 330 may enable the violation determination module 310 to communicate with the information recommendation module 320. In some embodiments, the communication module 330 may enable the information recommendation system to communicate with other external systems or devices. For example, the communication module 330 may obtain data and/or information from outside the system. As another example, the communication module 330 may send the information to be recommended determined by the information recommendation module 320 to other external systems or devices (for example, the driver terminal 140).

It should be understood that the system and modules shown in FIG. 3 may be implemented in various ways. For example, in some embodiments, the system and its modules thereof may be implemented by hardware, software, or a combination of software and hardware. The hardware may be implemented by a specific logic. The software may be stored in a storage and executed by an appropriate instruction execution system, such as a microprocessor or a dedicated design hardware. It will be understood by those skilled in the art that the above-mentioned methods and systems may be implemented using computer-executable instructions and/or embedded in control codes of a processor. For example, the control codes may be provided by a carrier medium, such as a disk, a CD, a DVD-ROM, a programmable storage such as a read-only memory (firmware), or a data carrier such as an optical carrier or an electronic signal carrier. The system and its modules thereof of the present disclosure may be implemented by a hardware circuit such as a super large-scale integrated circuits or a gate arrays, a semiconductor such as a logic chip, a transistor, etc., or a programmable hardware device such as a field programmable gate array, a programmable logic device, etc. The system and its modules thereof may be implemented by software that can be executed by various processors, or may be implemented by a combination (e.g., firmware) of the hardware circuit and the software.

It should be noted that the above description of the information recommendation system 300 and modules thereof is provided for the convenience of illustration, and not intended to limit the present disclosure within the scope of the embodiments mentioned. It may be understood that for those skilled in the art, after understanding the principle of the system, various modules may be combined arbitrarily, or the subsystems may be connected to other modules without departing from the principle. For example, in some embodiments, the violation determination module 310, the information recommendation module 320, and the communication module 330 may be different modules in one system, or may be integrated as a single module to implement the functions of the two or more modules mentioned above. For example, the violation determination module 310 and the communication module 330 may be combined into one module, or the information recommendation module 320 and the communication module 330 may be combined into one module. In some embodiments, one or more modules in the information recommendation system 300 may be added or deleted. For example, the information recommendation system 300 may further include a storage module configured to store violation behavior and its corresponding violation count determined by the violation determination module 310, and/or store information to be recommended determined by the information recommendation module 320. All such modifications are within the protection scope of the present disclosure.

Figure 4:
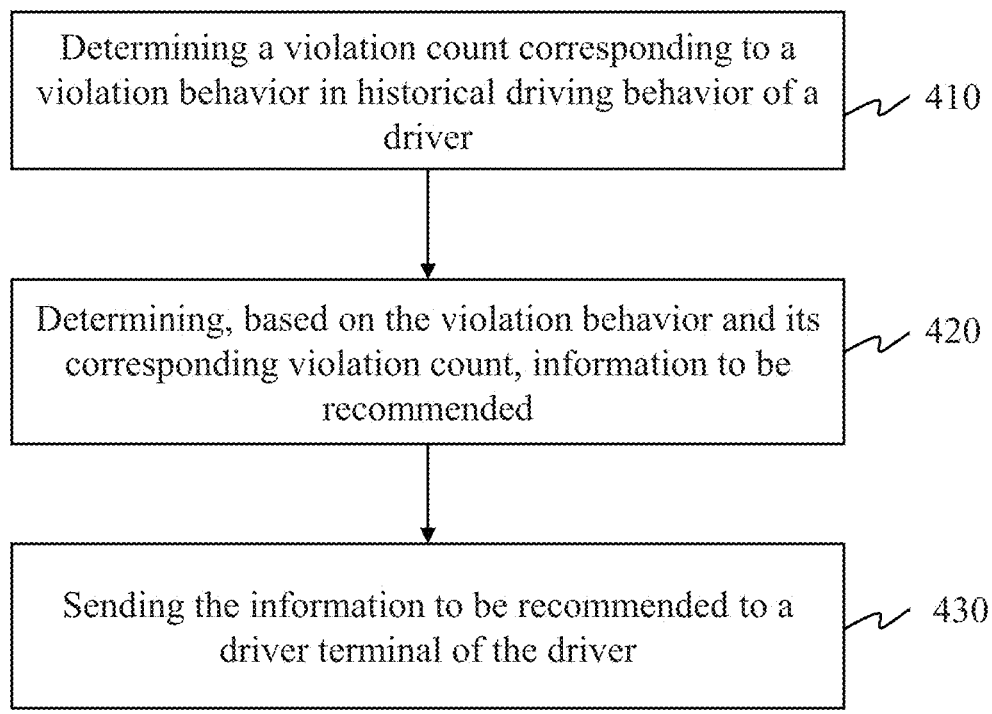
FIG. 4 is a flowchart illustrating an exemplary process for recommending information according to some embodiments of the present disclosure.

FIG. 4 is a flowchart illustrating an exemplary process 400 for recommending information according to some embodiments of the present disclosure.

In some embodiments, FIG. 4 may correspond to one or more modules in FIG. 3, and each operation of the process 400 may be implemented by one or more modules in FIG. 3. In some embodiments, the information recommendation process 400 may be executed by the information recommendation system 100. For example, the information recommendation process 400 may be implemented as a set of instructions (for example, an application program) stored in a storage device (for example, a storage device 150, a ROM 185, and a RAM 190). One or more components in the information recommendation system 100 may execute the set of instructions, and when the instructions are executed, one or more components in the information recommendation system 100 may be configured to execute the information recommendation process 400. For example, the processing device 112 (for example, a processor 180 of a computing device 100B, one or more modules shown in FIG. 3) may execute the set of instructions and execute the process 400. The operations of the illustrated flow presented below are intended to be illustrative. In some embodiments, the process 400 may be accomplished with one or more additional operations not described above and/or without the one or more operations discussed herein. In addition, the order of operations in the flowchart as shown in FIG. 4 and described below is not intended to be limiting.

The process 400 may include the following operations.

In 410, a violation count corresponding to a violation behavior in historical driving behavior of a driver may be determined. In some embodiments, operation 410 may be performed by the processing device 112, such as the violation determination module 310.

In the present disclosure, the violation behavior of the driver may include any behavior that does not comply with one or more driver behavior regulations (for example, system default regulations in a car-hailing platform and/or regulations set by a user). For example, the violation behavior of the driver may include a driving violation behavior, a pickup violation behavior, a service violation behavior, etc., or any combination thereof. Exemplary driving violation behavior may include not slowing down at an intersection, inattention, fatigue driving, drunk driving, illegal parking, running a red light, rapid acceleration, rapid deceleration, changing lanes rapidly, etc., or any combination thereof. Exemplary pickup violation behavior may include slow pick-up speed, detour driving, malicious refusal to load, carpooling violation behavior, not driving along a prescribed route, etc., or any combination thereof. Exemplary service violation behavior may include having an inconsistent credential, having a bad attitude, personal attacks, infringement of life and property, etc., or any combination thereof.

In some embodiments, the violation determination module 310 may obtain historical data relating to historical driving behavior of the driver, and determine a violation count corresponding to each of the one or more violation behavior based on the historical data. The historical data may include passenger evaluation information regarding completed orders of the driver, status data of driving behavior of the driver, historical violation records of the driver, etc., or any combination thereof. In some embodiments, the violation determination module 310 may obtain the historical data from one or more components of the information recommendation system 100, such as the storage device 150, the driver terminal 140, and the passenger terminal 130. Alternatively or additionally, the violation determination module 310 may obtain the historical data from an external source (for example, a third-party traffic information database).

In some embodiments, the passenger evaluation information regarding completed orders of the driver may include a passenger's description of the driving situation of the driver, and the violation behavior of the driver may be determined based on the description. In some embodiments, the passenger may input or select evaluation information for the driver through an input mechanism (for example, a text input mechanism, a voice input mechanism, an image input mechanism) of the passenger terminal 130. The passenger evaluation information may be in the form of text information, voice information, image information, etc. For example, a passenger may input a text description of the driving situation of the driver by typing in an App, wherein the text description may indicate whether the driver has violation behavior. As another example, the passenger may input a voice description of the driving situation of the driver in the App through voice recording. The violation determination module 310 may extract the driver's violation behavior from the passenger's text or voice description. For example, the violation determination module 310 may determine the violation behavior of the driver through techniques, such as text analysis, semantic recognition, image recognition, etc. As another example, an online car-hailing platform may provide the passenger with options regarding the driving behavior of the driver for the passenger to choose, and the options may include violation behavior of the drivers. The violation determination module 310 may determine the violation behavior of the driver according to the passenger's choice.

In some embodiments, the violation determination module 310 may obtain status data of the historical driving behavior of the driver. The status data of the historical driving behavior may include a position, a speed, an acceleration, an angular velocity, an angular acceleration, a driving path, a road condition, etc., or any combination thereof. For example, the status data of the historical driving behavior may include driving trajectory data collected by the sensor module 230 of the driver terminal 140, and/or environmental information around the vehicle collected by the input/output module 210 in the driver terminal 140 (for example, images around the vehicle). In some embodiments, the violation determination module 310 may determine the violation behavior of the driver based on the driving trajectory data. For example, the violation determination module 310 may determine whether the driver is speeding based on the speed information of the driver. Alternatively or additionally, the violation determination module 310 may determine the violation behavior of the driver based on the environmental information around the vehicle and the driving data. For example, the violation determination module 310 may determine that the vehicle is at an intersection based on the images of the vehicle's surroundings obtained from the input/output module 210, determine that the vehicle is not slowing down based on vehicle speed information obtained from the sensor module 230, and thus the violation determination module 310 may determine that the violation behavior of the driver is not slowing down at the intersection.

In some embodiments, the violation determination module 310 may obtain the historical violation records of the driver. For example, the violation determination module 310 may obtain driving information of the driver from a traffic management department, and the driving information may include the historical violation records of the driver. The historical violation records may include information, such as a time and a location of historical violation behavior of the driver. The violation determination module 310 may determine a violation count corresponding to the violation behavior in the historical driving behavior of the driver according to the historical violation records of the driver.

The violation determination module 310 may determine the violation count corresponding to each type of violation behavior. For example, for a specific violation behavior, the violation determination module 310 may determine the violation count that the driver has performed the specific violation behavior based on various historical data including the passenger evaluation information regarding completed orders, the status data of the historical driving behavior, and the historical violation records of the driver, etc., or any combination thereof, and use the sum of the violation count as the total violation count of this type of violation behavior. Optionally, the violation determination module 310 may also de-duplicate the violation count determined by different historical data, and use the violation count after the deduplication as the total violation count of this type of violation behavior. For example, the passenger evaluation information regarding completed orders of the driver and the historical violation records of the driver provided by a third party may include time and/or location information of the violation behavior. The violation determination module 310 may determine a first count and a second count that the driver performs a specific violation behavior according to the passenger evaluation information and the historical violation records, respectively. The violation determination module 310 may also determine a third count that the violation behavior is counted repeatedly according to the time and/or location information when the specific violation behavior occurs. The total count of violation behavior corresponding to the specific violation behavior may be equal to a difference between the third count and a sum of the first count and the second count.

In 420, information to be recommended may be determined based on the violation behavior and its corresponding violation count. In some embodiments, operation 420 may be performed by the information recommendation module 320. The determination of the information to be recommended may include determining a type of the information to be recommended, determining the content of the information to be recommended, determining a recommendation time of the information to be recommended, and determining a recommendation frequency of the information to be recommended, etc., or any combination thereof.

In some embodiments, the information to be recommended may include safety prompt information, restriction information, reward information, etc., or any combination thereof. The safety prompt information may be intended to provide a safety prompt to the driver, for example, to prompt the driver to avoid a certain violation behavior. The restriction information may be configured to restrict the driver from accepting orders, such as restrict the time, the place, and the count of orders that the driver can accept orders. The reward information may be configured to encourage or reward the driver, for example, reward the driver for complying with driver's regulations and/or correcting violation behavior. For example, the reward information may include praise, improvement of a service level of the driver, dispatch priority, monetary reward, etc., or any combination thereof.

In some embodiments, the information recommendation module 320 may determine the information to be recommended (for example, the type and the frequency of the information to be recommended) according to one or more thresholds of a violation count. For example, when the violation count corresponding to the violation behavior exceeds a first preset threshold, the information recommendation module 320 may determine that the information to be recommended includes the safety prompt information. As another example, when the violation count corresponding to the violation behavior of the driver exceeds a second preset threshold, the information recommendation module 320 may determine that the information to be recommended includes the restriction information to restrict the driver from accepting orders, wherein the second preset threshold is greater than the first preset threshold. As yet another example, when the violation count corresponding to the violation behavior of the driver is less than a third preset threshold or shows a decreasing trend in a historical time period, the information recommendation module 320 may determine that the information to be recommended includes the reward information. The third preset threshold is less than or equal to the first preset threshold, for example, the third preset threshold may be equal to zero.

By setting different preset thresholds, different information may be determined according to the violation count of the driver, and different levels of safety education or rewards may be provided to the driver. For example, when a count that the driver runs a red light exceeds the first preset threshold, the information recommendation module 320 may determine to send a safety prompt for reminding the driver not to run a red light. When the count that the driver runs a red light further increases and exceeds the second preset threshold, the information recommendation module 320 may determine to send order restriction information to prohibit the driver from accepting orders. As another example, when the driver has not run a red light in the past three months, the information recommendation module 320 may determine to send reward information to praise the driver for his/her good driving behavior.

In some embodiments, a preset threshold (for example, any one of the first, second, and third preset thresholds) may include a plurality of values, and different values may correspond to different information recommendation forms and/or frequencies. Taking the first preset threshold as an example, the first preset threshold may include a plurality of first preset thresholds, and different safety prompt information may be generated when the violation count reaches different first preset thresholds. For example, when the violation count of running red light reaches a lower first preset threshold, the safety prompt information may be played once to prompt the driver not to run a red light. When the violation count of running red light reaches a higher first preset threshold, the safety prompt information may be played three consecutive times to prompt the driver not to run a red light. As another example, when the violation count of running red light exceeds the higher first preset threshold, the frequency of the safety prompt information recommendation may be set to one hour/time. When the violation count of running red light exceeds the lower first preset threshold, the frequency of the safety prompt information recommendation may be set to six hours/time.

In some embodiments, a preset threshold (for example, any one of the first, second, and third preset thresholds) may be a default setting of the information recommendation system 100 or set by a user. Alternatively, the preset threshold may be determined by one or more components of the information recommendation system 100. For example, the processing device 112 may set different preset thresholds for different violation behavior. As another example, the processing device 112 may set a preset threshold specific to the driver based on the analysis of the driver's historical driving behavior. For details about the determination of the information to be recommended according to the preset threshold, please refer to FIG. 5 and its description. In some embodiments, the information recommendation module 320 may determine customized information to be recommended for different drivers. For example, the information recommendation module 320 may determine the information to be recommended based on profile information of the driver. In some embodiments, the information recommendation module 320 may individually determine the information to be recommended based on the profile information of the driver. For example, when the driver profile information indicates that the driver has a short driving experience, or the driver is a female, or the driver is older, the information determination module 320 may determine basic information to be recommended, such as a safety prompt information to pay attention or slow down when passing an intersection. As another example, if the driver profile information indicates that the driver's level of education is not high, the information recommendation module 320 may determine that the information to be recommended includes a prompt to remind the driver to use a civilized language. In some embodiments, the information recommendation module 320 may determine the information to be recommended based on a combination of violation behavior, the violation count, and the profile information of the driver. For example, when a driver has driving violation behavior, the information recommendation module 320 may further obtain the profile information of the driver to determine whether the driver's driving experience has reached a certain count of years. If the driver has reached a certain count of years, the driver may be deemed as having a rich driving experience. The driving violation behavior of the driver may indicate that the driver has stubborn bad driving habits that are difficult to change, and a limited room for improvement. In such cases, the information recommendation module 320 may lower a preset threshold (for example, the first preset threshold or the second preset threshold) in order to carry out safety education to the driver as soon as possible (for example, sending safety prompt information or restriction information). If the driving experience of the driver has not reached a certain count of years, the driver may be deemed as not having a rich driving experience and the driving violation behavior may be caused by insufficient driving experience, indicating that the driver has a greater room for improvement. In such cases, the information recommendation module 320 may increase the preset threshold, so that the driver may have more opportunities to accumulate driving experience and improve driving ability.

As another example, the information recommendation module 320 may customize the information to be recommended based on the historical violation behavior of the driver. For example, based on the historical violation records of the driver, the location at which and the time period during which the driver has violation behavior frequently may be determined. The information recommendation module 320 may generate information to be recommended based on the determined location and time. For example, the information to be recommended may include "you have violated 5 times at the intersection A last month, and you have violated 2 times at 9-10 a.m. Please pay attention to driving regulations and driving safety."

In 430, the information to be recommended may be sent to a driver terminal of the driver. In some embodiments, operation 430 may be performed by the communication module 330.

The communication module 330 may send the information to be recommended to the driver terminal. In some embodiments, the communication module 330 may send the information to be recommended to the driver terminal 140 via the network 120. In some embodiments, when the information to be recommended includes text information and/or image information, the driver terminal 140 (for example, the display module 220) may visualize the text information and/or image information. For example, the driver terminal 140 may display the text information and/or image information on the display screen. In some embodiments, when the information to be recommended includes sound information, the driver terminal 140 may play the sound information. In some embodiments, when the information to be recommended includes restriction information, an application (for example, a car-hailing application) installed on the driver terminal 140 may stop dispatching or allocating orders to the driver.

In some embodiments, operation 430 may be executed only when a specific recommendation condition is met. For example, the information recommendation module 320 may determine whether the recommendation condition is met. In response to a determination result that the recommendation condition is met, the information recommendation module 320 may send an instruction to the communication module 330 to send the information to be recommended to the driver terminal. Merely by way of example, the recommendation condition may include that the violation count corresponding to the violation behavior exceeds the first preset threshold, the driver drives to a specific location (for example, a location where the driver and/or other drivers often violate regulations, etc.), a current time is in a specific time period (for example, the time period when the driver and/or other drivers frequently violate regulations), etc., or any combination thereof.

In some embodiments, the information recommendation module 320 may obtain data relating to current driving behavior of the driver. For example, the information recommendation module 320 may obtain the driver's location information from the sensor module 230 of the driver terminal 140 in real-time or intermittently (for example, periodically or irregularly). The information recommendation module 320 may further determine whether the recommendation condition is met based on the data relating to the current driving behavior of the driver. For example, the information recommendation module 320 may determine whether the driver is driving to places that are easy to violate regulations, such as an intersection, according to the location information of the driver. If the driver drives to a place that is easy to violate regulations, the information recommendation module 320 may determine that the recommendation condition is met, and then instruct the communication module 330 to send the information to be recommended to the driver terminal 140.

It should be noted that the above description of the process 400 is provided for the purpose of illustration and not intended to limit the scope of the present disclosure. For those skilled in the art, various modifications and changes may be conducted to the process 400 under the teaching of the present disclosure. However, these modifications and changes are still within the scope of the present disclosure. For example, the process 400 may add operations of determining whether the recommendation condition is met. As another example, one operation in the process 400 may be divided into two or more sub-operations to be executed or a plurality of operations may be combined into one operation to be executed.

Figure 5:
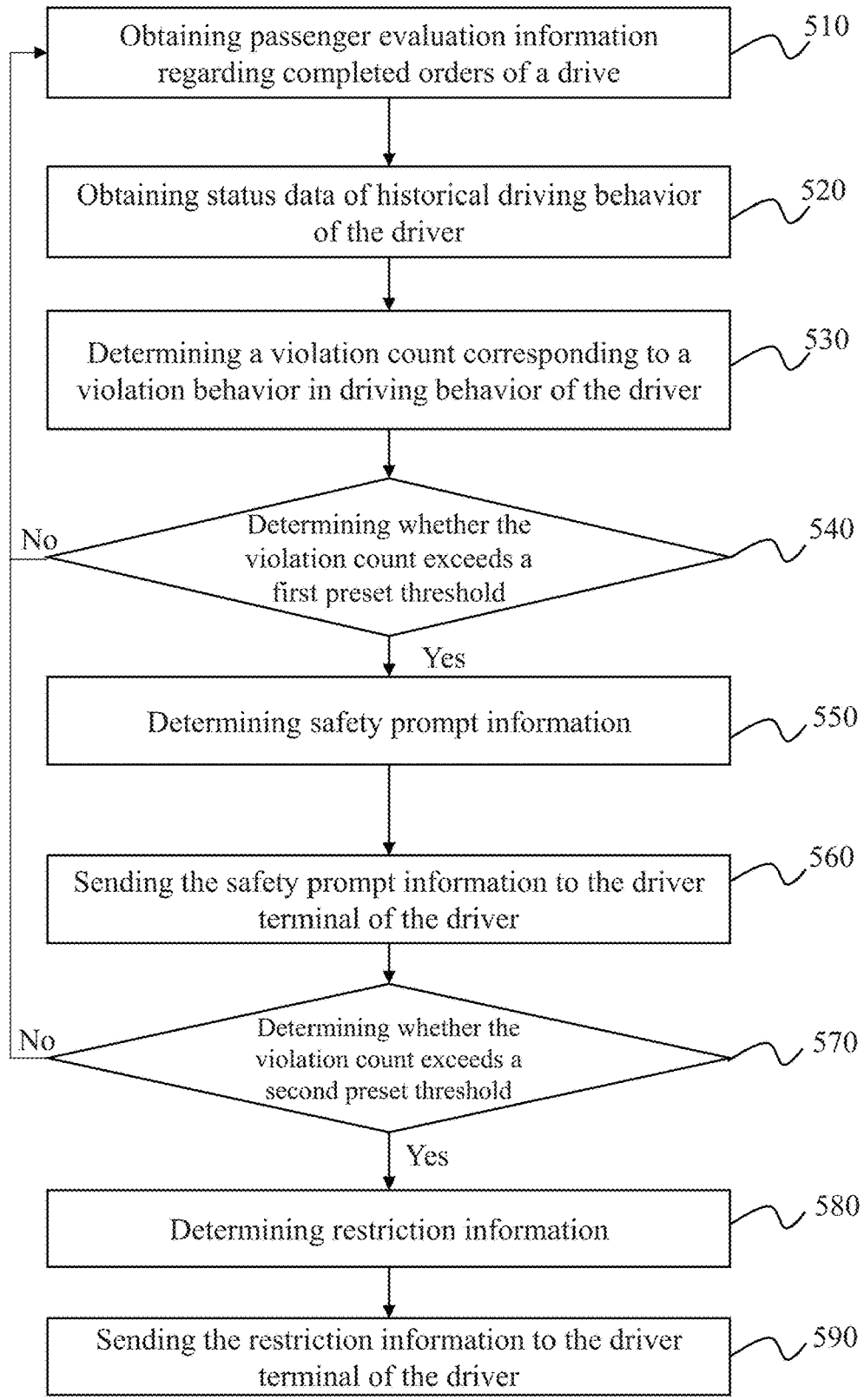
FIG. 5 is a flowchart illustrating an exemplary process for determining information to be recommended according to some embodiments of the present disclosure.

FIG. 5 is a flowchart illustrating an exemplary process 500 for determining information to be recommended according to some embodiments of the present disclosure.

In some embodiments, FIG. 5 may be implemented by one or more modules in FIG. 3. In some embodiments, the process 500 may be executed by the information recommendation system 100. For example, the process 500 may be implemented as a set of instructions (for example, an application program) stored in a storage device (for example, a storage device 150, a ROM 185, and a RAM 190). One or more components of the information recommendation system 100 may execute the set of instructions, and when the instructions are executed, one or more components in the information recommendation system 100 may be configured to execute the process 500. For example, the processing device 112 (for example, the processor 180 of the computing device 100B, one or more modules shown in FIG. 3) may execute the set of instructions and execute the process 500. The operations of the illustrated flow presented below are intended to be illustrative. In some embodiments, the process 500 may be accomplished with one or more additional operations not described above and/or by without one or more operations herein discussed herein. In addition, the order of operations in the flowchart as shown in FIG. 4 and described below is not limiting.

The process 500 may include the following operations.

In 510, passenger evaluation information regarding completed orders of a driver may be obtained. For detailed descriptions of obtaining the passenger evaluation information of the driver, please refer to the description of operation 410 in FIG. 4, which will not be repeated here.

In 520, status data of historical driving behavior of the driver may be obtained. For detailed descriptions of obtaining the status data of the historical driving behavior of the driver, please refer to the description of operation 410 in FIG. 4, which will not be repeated here.

In 530, a violation count corresponding to a violation behavior of the driver may be determined according to the passenger evaluation information and the status data of the historical driving behavior of the driver. For detailed descriptions of determining the violation count, please refer to the description of operation 410 in FIG. 4, which will not be repeated here.

In 540, whether the violation count exceeds a first preset threshold may be determined. In some embodiments, operation 540 may be performed by the information recommendation module 320.

In some embodiments, the first preset threshold is a threshold relating to an initial safety education (for example, sending a safety prompt information) to the driver. The first preset threshold is an integer greater than zero. The first threshold may be manually set or determined by one or more components of the information recommendation system 100. For example, an operator may manually set a first preset threshold for each of different violation behavior. The first preset threshold corresponding to the violation behavior of having an inconsistent credential may be set to 1. The threshold corresponding to the violation behavior of fatigue driving may be 1, 2, 3, 4, etc. The first preset threshold corresponding to the violation behavior of speeding may be set to 3, 4, 5, etc. As another example, the processing device 112 may determine the first preset threshold according to historical driving behavior of the driver. Merely by way of example, the processing device 112 may analyze a violation possibility of the driver based on his/her historical driving behavior. If the violation probability of the driver exceeds a certain threshold, the first preset threshold of the driver may be set to a lower value. If the violation probability of the driver is less than the certain threshold, the first threshold may be set to a higher value. As a result, different safety prompt strategies may be implemented for different drivers, effectively reducing driver violation behavior.

In some embodiments, the first preset threshold may be automatically set according to a change in the violation behavior of the driver after receiving safety education. For example, the information recommendation module 320 may determine the first preset threshold by analyzing historical data after the driver has received safety education prompts. Specifically, the information recommendation module 320 may determine an initial first threshold for a violation behavior, and then determine whether the violation count corresponding to the violation behavior of the driver is significantly reduced after a safety prompt is sent to the driver based on the initial first threshold. If there is a significant decrease, the information recommendation module 320 may determine the initial first threshold as the first preset threshold. If there is no significant decrease, the information recommendation module 320 may lower the initial first threshold, and determine whether the violation count corresponding to the violation behavior of the driver is significantly reduced after safety education is sent to the driver based on the lowered preset threshold. If there is a significant decrease, the lowered first threshold may be determined as the first preset threshold. If not, the first threshold may be lowered again until a suitable threshold is determined to be the first preset threshold.

In 550, safety prompt information may be determined. In some embodiments, operation 550 may be performed by the information recommendation module 320. The safety prompt information may be recommended to drivers whose violation behavior is not serious, which may be used to remind the driver without restricting the behavior of the driver. In some embodiments, the safety prompt information may include voice information, text information, image information, or the like, or any combination thereof.

In 560, the safety prompt information may be sent to the driver terminal 140. In some embodiments, operation 560 may be performed by the communication module 330. In some embodiments, the communication module 330 may send the safety prompt information to the driver terminal 140 via the network 120.

In 570, whether the violation count exceeds a second preset threshold may be determined. The second preset threshold may be a threshold relating to a further safety education. In some embodiments, the violation count in operation 570 may be the same as the violation count in operation 540. In some embodiments, the violation count in operation 570 may be an updated violation count of the driver determined after operation 560 is performed. In some embodiments, the second preset threshold may be a threshold relating to certain restrictions imposed on the driver's behavior (for example, order prohibition). The second preset threshold is an integer greater than zero. In some embodiments, the second preset threshold may be greater than the first preset threshold. In some embodiments, the second threshold may be manually set. For example, an operator may set the second preset threshold based on experience. In some embodiments, the second preset threshold may be automatically set. For example, the information recommendation module 320 may determine the second preset threshold after analyzing historical data.

If the violation count exceeds the second preset threshold, operation 580 may be performed. Otherwise, the process 500 may proceed back to operation 510.

In 580, restriction information may be determined. In some embodiments, operation 580 may be performed by the information recommendation module 320. Restriction information refers to information that restricts the driver from accepting orders. For example, the restriction information may specify a maximum count of orders that the driver can accept within a certain time period, so that the driver can only accept a limited count of orders. In some embodiments, the restriction information may restrict the driver to only accept orders during a certain time period, for example, the driver may only accept orders during the daytime (such as 8:00-18:00) every day. As another example, the restriction information may include order prohibition information. Order prohibition refers to prohibiting a driver from accepting orders, which prevents the driver from providing vehicle transportation services through a transportation service platform (such as an online car-hailing service platform). In some embodiments, the order prohibition information may include that the online car-hailing service platform stops distributing online car-hailing orders to the driver. In some embodiments, the order prohibition information may include prohibiting the driver from accepting orders on the driver terminal 140. In some embodiments, the order prohibition information may include prohibiting the driver from accepting orders in a period of time. For example, the period of time may be 24 hours, 12 hours, 6 hours, 3 hours, 1 hour, etc. After this period of time, the information recommendation module 320 may automatically release the prohibition or require the driver to complete a certain task to release the prohibition. In some embodiments, the task may include completing an online education course and/or the violation count during the prohibition period does not exceed a certain threshold (for example, the first preset threshold or the second preset threshold).

In 590, the restriction information may be sent to the driver terminal of the driver, and the restriction information may be used to restrict the driver from accepting orders. In some embodiments, operation 590 may be performed by the communication module 330. In some embodiments, the communication module 330 may send the restriction information to the driver terminal 140 via the network 120. In some embodiments, when the restriction information is order prohibition information, the driver terminal 140 may stop displaying order dispatching information. Specifically, the driver terminal 140 may stop displaying text and/or image relating to service orders, or the driver terminal 140 may stop playing the voice relating to service orders.

It should be noted that the above description is provided only for the purpose of illustration and is not intended to limit the scope of the present disclosure. For those skilled in the art, various changes or modifications may be made under the teaching of the present disclosure. However, these modifications and changes do not depart from the scope of in the present disclosure. For example, operations 540 to 560 and operations 570 to 590 may be executed simultaneously. In some embodiments, operations 540 to 560 may be omitted. Alternatively, operations 570 to 590 may be omitted.

In some embodiments, the process 500 may further include one or more operations. For example, the process 500 may further include determining whether the violation count is less than a third preset threshold or whether the violation count shows a decreasing trend in a historical time period. The third preset threshold may be an integer smaller than the first threshold and greater than or equal to zero. When the violation count corresponding to the violation behavior of the driver is less than the third preset threshold or shows a decreasing trend, it may indicate that the driver has less violation behavior or the driver has corrected his violation behavior, and the information recommendation module 320 may determine reward information. As another example, the process 500 may further include obtaining historical violation records of the driver. In the operation 530, the violation count may be determined based on the passenger evaluation information, the status data of historical driving behavior of the driver, and the historical violation records.

The beneficial effects of embodiments of the present disclosure may include but are not limited to: (1) by regularly adjusting information to be recommended according to the driving behavior of the driver and the passenger evaluation information, and adjusting the safety education strategy for the driver in time, more suitable information can be determined and recommended to the driver; (2) by providing different information recommendation modes for drivers with different degrees of driving violations, drivers can effectively be stimulated to correct their driving behaviors; (3) by providing the driver with personalized warning information, the driver' awareness of safe driving can be improved; and (4) by providing the driver with different degrees of rewards and/or sanctions, the driver's driving enthusiasm can be stimulated, driving skills can be standardized, and traffic accidents can be reduced. It should be noted that different embodiments may have different beneficial effects. In different embodiments, the possible beneficial effects may include any combination of one or more of the above, or any other possible beneficial effects that may be obtained.

Having thus described the basic concepts, it may be rather apparent to those skilled in the art after reading this detailed disclosure that the foregoing detailed disclosure is intended to be presented by way of example only and is not limiting. Although not explicitly stated here, those skilled in the art may make various modifications, improvements and amendments to the present disclosure. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various parts of this specification are not necessarily all referring to the same embodiment. In addition, some features, structures, or features in the present disclosure of one or more embodiments may be appropriately combined.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, all aspects of the present disclosure may be performed entirely by hardware, may be performed entirely by software (including firmware, resident software, microcode, etc.), or may be performed by a combination of hardware and software. The above hardware or software can be referred to as "data block", "module", "engine", "unit", "component" or "system". In addition, aspects of the present disclosure may appear as a computer product located in one or more computer-readable media, the product including computer-readable program code.

A computer storage medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer storage medium may be any computer readable medium that is not a computer readable storage medium and that may communicate, propagate, or transport a program for use by or in connection with an instruction execution system, apparatus, or device. Program code embodied on a computer storage medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. However, this disclosure does not mean that the present disclosure object requires more features than the features mentioned in the claims. Rather, claimed subject matter may lie in less than all features of a single foregoing disclosed embodiment.

What is claimed is:

1. A method for information recommendation, comprising:
   determining a violation count corresponding to a violation behavior in historical driving behavior of a driver;
   determining, based on the violation behavior and its corresponding violation count, information to be recommended; and
   sending the information to be recommended to a driver terminal of the driver,
   wherein the determining the information to be recommended comprises:
      determining whether the violation count corresponding to the violation behavior exceeds a first preset threshold and does not exceed a second preset threshold;
      in response to a determination result that the violation count corresponding to the violation behavior exceeds the first preset threshold and does not exceed the second preset threshold, sending the safety prompt information to the driver terminal of the driver; and determining whether the violation count corresponding to the violation behavior exceeds the second preset threshold;

in response to a determination result that the violation count corresponding to the violation behavior exceeds the second preset threshold, sending a restriction information to the driver terminal of the driver, wherein the restriction information is used to restrict the driver from accepting orders, and the restricting the driver from accepting orders includes:

directing the driver terminal to stop displaying text and/or image relating to service orders or stop playing voice relating to the service orders.

2. The method of claim 1, wherein the determining a violation count corresponding to a violation behavior in historical driving behavior of a driver comprises:

obtaining historical data relating to the historical driving behavior of the driver, the historical data including at least one of passenger evaluation information regarding completed orders of the driver, status data of the historical driving behavior of the driver, or historical violation records of the driver; and determining, based on the historical data, the violation count corresponding to the violation behavior of the driver.

3. The method of claim 2, wherein the status data of the historical driving behavior of the driver includes at least one of a speed, an acceleration, an angular velocity, an angular acceleration, a driving path, or a road condition.

4. The method of claim 1, wherein the information to be recommended includes safety prompt information for prompting the driver to pay attention to the violation behavior.

5. The method of claim 1, further comprising:

determining, based on at least one of a type of the violation behavior or the historical driving behavior of the driver, the first preset threshold.

6. The method of claim 1, wherein the information to be recommended includes reward information.

7. The method of claim 6, wherein the determining the information to be recommended comprises:

determining whether the violation count corresponding to the violation behavior is less than a third preset threshold or shows a decreasing trend in a historical time period; and in response to a determination result that the violation count corresponding to the violation behavior is less than the third preset threshold or shows a decreasing trend in the historical time period, sending the reward information to the driver terminal of the driver.

8. The method of claim 1, wherein the sending the information to be recommended to a driver terminal of the driver comprises:

determining whether a recommendation condition is met; and in response to a determination result that the recommendation condition is met, sending the information to be recommended to the driver terminal of the driver.

9. The method of claim 8, wherein the determining whether a recommendation condition is met comprises:

obtaining data corresponding to current driving behavior of the driver; and determining, based on the data corresponding to current driving behavior of the driver, whether the recommendation condition is met.

10. The method of claim 1, wherein the method further comprises:

obtaining profile information of the driver; and determining, based on the profile information, the information to be recommended.

11. The method of claim 10, wherein the profile information of the driver includes at least one of an age, a gender, a driving experience, or an education level.

12. The method of claim 1, wherein the information to be recommended includes at least one of voice information, text information, or image information.

13. The method of claim 1, wherein the violation behavior includes at least one of not slowing down at an intersection, inattention, fatigue driving, drunk driving, running a red light, rapid acceleration, rapid deceleration, changing lanes rapidly, having an inconsistent credential, or having a bad attitude.

14. A system for information recommendation, comprising:

at least one storage device for storing computer instructions; and at least one processor communicating with the storage device, wherein when the at least one processor executes the computer instructions, the at least one processor causes the system to:

determine a violation count corresponding to a violation behavior in historical driving behavior of a driver;

determine, based on the violation behavior and its corresponding violation count, information to be recommended; and send the information to be recommended to a driver terminal of the driver, wherein to determine the information to be recommended, the at least one processor causes the system to:

determine whether the violation count corresponding to the violation behavior exceeds a first preset threshold and does not exceed a second preset threshold;

in response to a determination result that the violation count corresponding to the violation behavior exceeds the first preset threshold and does not exceed the second preset threshold, send the safety prompt information to the driver terminal of the driver; and determining whether the violation count corresponding to the violation behavior exceeds the second preset threshold;

in response to a determination result that the violation count corresponding to the violation behavior exceeds the second preset threshold, send a restriction information to the driver terminal of the driver, wherein the restriction information is used to restrict the driver from accepting orders, and the at least one processor further causes the system to:

direct the driver terminal to stop displaying text and/or image relating to service orders or stop playing voice relating to the service orders.

15. The system of claim 14, wherein to determine a violation count corresponding to a violation behavior in historical driving behavior of a driver, the at least one processor further causes the system to:

obtain historical data relating to the historical driving behavior of the driver, the historical data including at least one of passenger evaluation information regarding completed orders of the driver, status data of the historical driving behavior of the driver, or historical violation records of the driver; and determine, based on the historical data, the violation count corresponding to the violation behavior of the driver.

16. The system of claim 14, wherein to send the information to be recommended to a driver terminal of the driver, the at least one processor further causes the system to:
- determine whether a recommendation condition is met; and
- in response to a determination result that the recommendation condition is met, send the information to be recommended to the driver terminal of the driver.

17. A computer-readable storage medium storing a set of instructions, wherein when executed by at least one processor, the set of instructions direct the at least one processor to effectuate a method, the method comprising:
- determining a violation count corresponding to a violation behavior in historical driving behavior of a driver;
- determining, based on the violation behavior and its corresponding violation count, information to be recommended; and
- sending the information to be recommended to a driver terminal of the driver,
- wherein the determining the information to be recommended comprises:
- determining whether the violation count corresponding to the violation behavior exceeds a first preset threshold and does not exceed a second preset threshold;
- in response to a determination result that the violation count corresponding to the violation behavior exceeds the first preset threshold and does not exceed the second preset threshold, sending the safety prompt information to the driver terminal of the driver; and
- determining whether the violation count corresponding to the violation behavior exceeds the second preset threshold;
- in response to a determination result that the violation count corresponding to the violation behavior exceeds the second preset threshold, sending a restriction information to the driver terminal of the driver, wherein the restriction information is used to restrict the driver from accepting orders, and the restricting the driver from accepting orders includes:
- directing the driver terminal to stop displaying text and/or image relating to service orders or stop playing voice relating to the service orders.

18. The method of claim 1, wherein the service orders include an online car-hailing order.

19. The method of claim 1, wherein the first preset threshold includes a plurality of values, and different information recommendation forms and/or frequencies are generated when the violation count reaches different values.

20. The method of claim 1, wherein the first preset threshold is automatically set according to a change in the violation behavior of the driver after receiving the safety prompt information.

* * * * *